United States Patent Office 2,981,098
Patented Apr. 25, 1961

2,981,098
THRUSTMETER

Spyridon P. Antippas, New York, and Harold S. Koletsky, Westbury, N.Y., assignors to Avien, Inc., Woodside, N.Y.

Filed Oct. 9, 1957, Ser. No. 689,175

14 Claims. (Cl. 73—116)

This invention relates generally to aircraft instrumentation and more particularly to a device for instrumenting the gross thrust of a turbo-jet engine.

The modern turbo-jet engine is capable of operation at great altitude where ambient pressure is very low, and at high speed with a high turbine outlet pressure. One of the limiting factors in earlier thrustmeters has been the need for calculating the ratio of these two pressures and using the result to determine the gross thrust. The disadvantage of this approach, however, lies in the infeasibility through conventional instrumentation of accurately determining pressure ratios wherein the pressures involved vary over a range in excess of 10:1.

In order to obtain additional thrust, and consequently greater speed, an afterburning process is sometimes used in the turbo-jet engine. Due to the high consumption of fuel, this process is used mainly for relatively short periods. Nevertheless, the instrumentation of thrust is deisrable during afterburning operation, as well as in ordinary non-afterburning operation. This introduces an additional complexity, however. For practical reasons in measuring thrust, pressure is sensed at the turbine outlet rather than at the nozzle. Afterburning operations, when functioning, take place posterior to the turbine outlet. For this reason, if pressure is to be sensed at the turbine outlet, even during afterburning operations, special provision must be made for including the effects of this afterburning operation on the instrumentation of gross thrust both at subsonic and supersonic speeds.

It is, therefore, an object of this invention to provide means for the accurate instrumentation of gross thrust developed by a turbo-jet engine through a wide range of ratios of turbine outlet pressure to ambient pressure.

Another object of this invention is the provision of instrumentation of gross thrust without recourse to continuous, accurate pressure ratio measurements, thus making is possible to achieve accurate thrust indication by means of conventional potentiometer type pressure transducers.

Another object of this invention is to provide a device that accurately measures the gross thrust of a turbo-jet engine in the regions both above and below Mach 1.

A further object of this invention is to provide a device that accurately measures the gross thrust of a turbo-jet engine with or without afterburning operation.

Yet another object of this invention is to provide a device that accurately measures the gross thrust of a turbo-jet engine both at subsonic and supersonic speeds, and with or without afterburner operation.

Still another object of the invention is to provide a thrustmeter that will sense and take into account varying nozzle outlet areas.

Other objects and advantages will be apparent upon consideration of the following discussion.

According to the invention, therefore, there is provided a device for instrumenting the gross thrust of the turbo-jet engine, either on the ground or during flight, the said device utilizing means for sensing four variables—turbine outlet pressure, ambient pressure, nozzle area and afterburner status. A computer is provided, together with means for feeding signals analogous to the above-mentioned four parameters into the computer to determine gross thrust in accordance with a selected one of four equations. Means are also provided for the selection by the input signal parameters of the appropriate equation for computer operation.

The said four equations are derived from the general thrust equation to cover the subsonic and the supersonic velocity regions, with and without afterburning operation. In the derivations certain approximations are made which considerably simplify the resulting equations and their physical implementation, nevertheless, keeping the results obtained within an acceptable margin of error. This invention will be described by reference to a drawing of three figures in which.

According to the invention, the thrustmeter senses four design parameters:

(1) $P_{t5}$=absolute turbine outlet pressure in pounds per square inch (p.s.i.a.);

(2) $P_{am}$=absolute ambient pressure in pounds per square inch (p.s.i.a.);

(3) $A_7$=cross-section area of the exhaust nozzle in square inches; and (4) The "On" or "Off" status of the afterburner.

The ratio $$\frac{P_{t5}}{P_{am}}$$

is designated as the pressure ratio. A critical pressure ratio exists at Mach 1. At this point $$\frac{P_{t5}}{P_{am}}=2$$

The mathematical expression for gross thrust is not quite the same for the condition where $$\frac{P_{t5}}{P_{am}}$$

is greater than 2 at supersonic flight as it is for the condition where $$\frac{P_{t5}}{P_{am}}$$

is less than 2 at subsonic flight. Provision is here made for this divergence.

Similarly, the mathematical expression for gross thrust is not quite the same for the condition of flight wherein the afterburner status is "On" as it is for the condition wherein the afterburner status is "Off." Provision is herein also made for this divergence.

Gross thrust may be expressed mathematically as follows:

(A) With the afterburner turned "Off" and the pressure ratio $$\left\{\frac{P_{t5}}{P_{am}}\right\}<2$$

$$F_g=\frac{A_7 p(A_7)}{P_0}\{P_{t5}[1+.5n(A_7)]-P_{am}n(A_7)\}$$

(B) With the afterburner turned "Off" and the pressure ratio $$\frac{P_{t5}}{P_{am}} > 2$$

$$F_g = \frac{A_7 p(A_7)}{P_0} \{ P_{t5}[1 + .5m(A_7)] - P_{am} m(A_7) \}$$

(C) With the afterburner turned "On" and the pressure ratio $$\frac{P_{t5}}{P_{am}} < 2$$

$$F_g = \frac{A_7 P_{ab}}{P_0} \{ P_{t5}[1 + .5n_{ab}] - P_{am} n_{ab} \}$$

(D) With the afterburner turned "On" and the pressure ratio $$\frac{P_{t5}}{P_{am}} > 2$$

$$F_g = \frac{A_7 P_{ab}}{P_0} \{ P_{t5}[1 + .5m_{ab}] - P_{am} m_{ab} \}$$

$P_{ab}$ = A calibration constant which appears in the mathematical expression for gross thrust wherein the afterburner status is "On." The value of this constant is dependent on the particular engine under consideration. A typical or median value may be taken as 8.028 under the following conditions:

$P_0$ = Standard atmosphere pressure in pounds per square inch, to which tests and calibration on the turbo-jet engine have been referred, and accepted as equal to 14.7 p.s.i.

Figure 2:
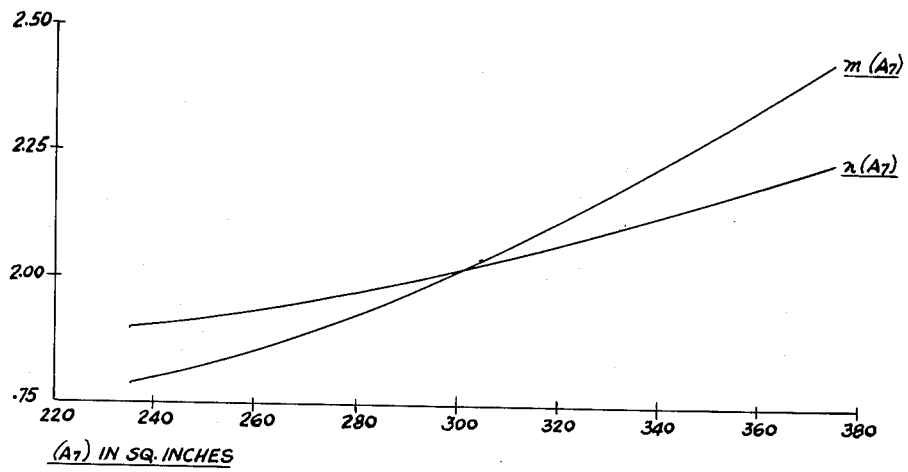
Figure 2 is a graph of the numerical values of the theoretical functions $m(A_7)$ and $n(A_7)$.

$m(A_7)$ = Theoretically derived quantity having values for $(A_7)$ graphically shown in Figure 2 and independent of the particular engine under consideration.

$m_{ab}$ = A constant, which is independent of the particular engine under consideration, having the approximate value of 1.980, and which is adopted to simplify the implementation of gross thrust within an acceptable margin of error.

$n_{ab}$ = A constant, which is independent of the particular engine under consideration, having the approximate value of 2.380, and which is adopted to simplify the implementation of gross thrust within an acceptable margin of error.

The gross thrust is found from general afterburner status and nozzle characteristic curves involving turbine outlet pressure, ambient pressure and nozzle outlet area. The gross thrust for a specific engine is instrumented from these curves, as expressed mathematically in the four equations above, and from a sea level engine calibration.

The technique utilized requires sensing four variables: turbine outlet pressure ($P_{t5}$), ambient pressure ($P_{am}$), nozzle outlet area ($A_7$) and afterburner status. These parameters are fed into a computer and determine the gross thrust ($F_g$) by first activating one of four equations and then solving for gross thrust.

Figure 1:
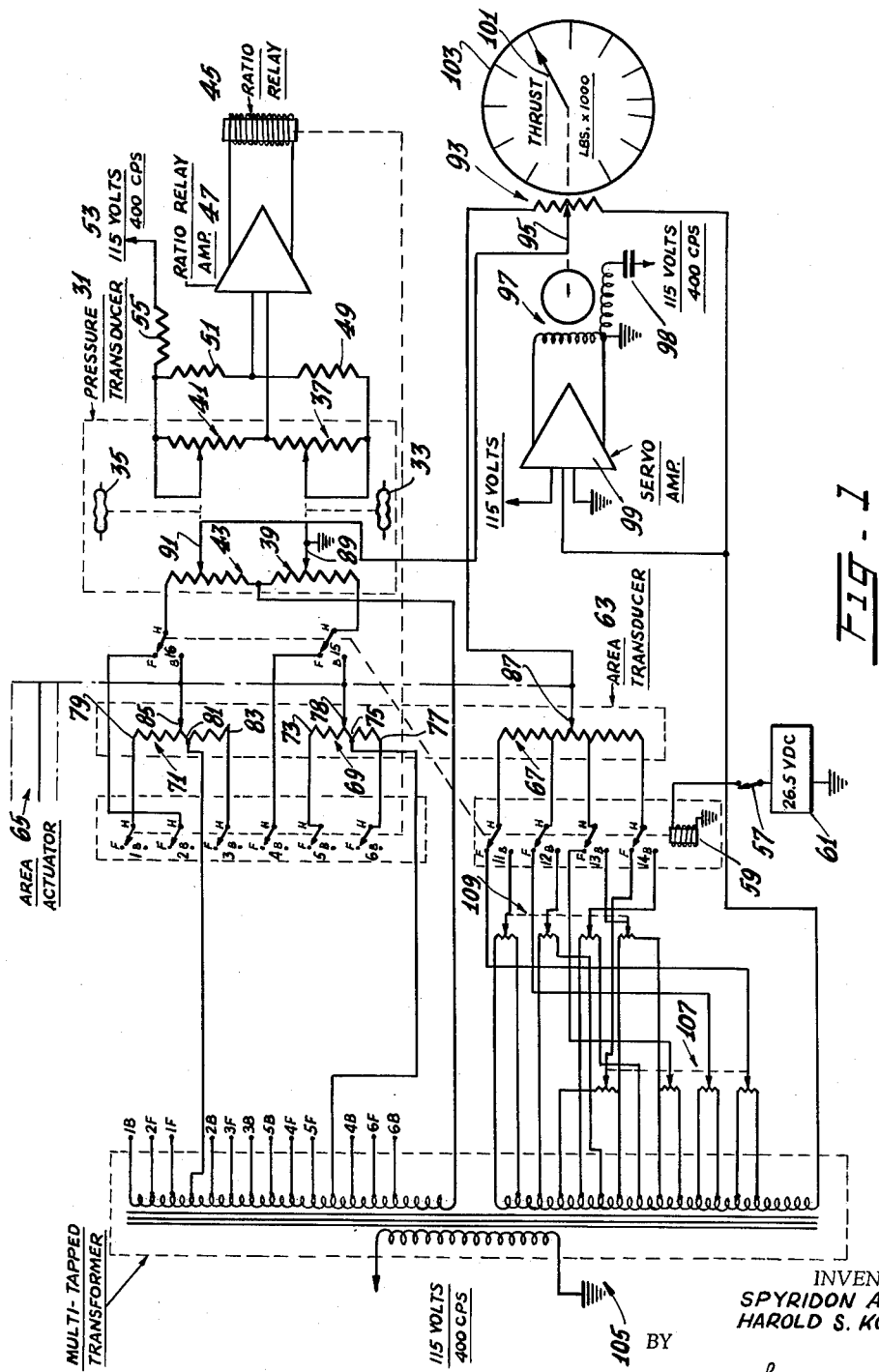
Figure 1 is a diagrammatic schematic and block diagram of a thrustmeter according to the invention.

Figure 1 shows diagrammatically a pressure transducer 31 which contains a pair of diaphragm capsules 33 and 35 which are housed in separate chambers. Diaphragm capsule 33 is subjected to the ambient pressure and diaphragm capsule 35 is subjected to the turbine outlet pressure. Each of these capsules activates a pair of precision potentiometers. These in turn are used in the computer net-work.

The ambient pressure diaphragm capsule 33 activates precision potentiometers 37 and 39. The turbine outlet pressure diaphragm capsule 35 activates precision potentiometers 41 and 43.

The ratio relay 45 determines whether the thrustmeter will operate according to the subsonic equations or according to the supersonic equations. It is responsive to the pressure ratio $P_{t5}/P_{am}$. The ratio relay is operated by a ratio relay amplifier connected to the signal terminals of a Wheatstone bridge. This bridge has two fixed resistors 49 and 51, and two variable resistors 37 and 41. The variable resistor 37 is proportional to ambient pressure ($P_{am}$). The variable resistor 41 is proportional to turbine outlet pressure ($P_{t5}$). The bridge is balanced when $P_{t5}:P_{am}=2$, or $P_{am}:P_{t5}=0.500$, and is excited from the 115 volt 400 c.p.s. supply 53 through the voltage dropping resistor 55. Consequently, the polarity of the unbalance voltage of this bridge will depend on the sign of $$\left( \frac{P_{am}}{P_{t5}} = 0.5 \right)$$

By proper choice of polarities the relay will close with the unbalance of one phase and open with unbalance of the opposite phase.

For non-afterburning operation the afterburner switch 57 is opened. The switch 57 is mechanically coupled to the afterburner control operated by the pilot. Thus in effect the operation of the afterburner circuit is automatically instituted when the afterburner is in operation. The afterburner relay 59 which is excited from the 26.5 volt D.C. supply 61 is thus de-energized and its contacts 11B, 12B, 13B, 14B and 15B and 16B are closed.

The area transducer 63 is a multi-winding potentiometer mechanically linked to the outlet area actuator 65 of the turbo-jet engine which controls nozzle outlet area. The windings of the three potentiometers 67, 69 and 71 of the area transducer are shaped respectively to yield outputs as determined from the design parameters. When the ratio relay 45 is de-energized the contacts 1B, 2B, 3B, 4B, 5B, and 6B are closed. This happens when the ratio $P_{am}/P_{t5}$ is less than 0.05 (which is equivalent to the ratio $P_{t5}/P_{am}$ being greater than 2). When the ratio relay 45 is energized the contacts, 1F, 2F, 3F, 4F, 5F and 6F are closed. This happens when the ratio $P_{am}/P_{t5}$ is greater than 0.50 (which is equivalent to the ratio $P_{t5}/P_{am}$ being less than 2).

The voltages applied to points 73, 75 and 77 potentiometer 69 are respectively porportional to $m(235)$, $m(305)$, and $m(375)$ when the ratio relay 45 is de-energized and are respectively proportional to $n(235)$, $n(305)$ and $n(375)$ when the ratio relay 45 is energized. The potentiometer wiper 77, therefore, picks up an output voltage $e$, proportional to $m(A_7)$ when the pressure ratio $P_{t5}/P_{am}$ is greater than 2 and proportional to $n(A_7)$ when the pressure ratio $P_{t5}/P_{am}$ is less than 2.

The values for $m(A_7)$ and $n(A_7)$ are theoretically derived, independently of the particular engine under consideration and are graphically shown in Figure 2.

Similarly, the voltages applied to points 79, 81 and 83 on potentiometer 71 are respectively proportional to $1+0.50\ m(235)$, $1+0.50\ m(305)$ and $1+0.50\ m(375)$ when the pressure ratio $P_{t5}/P_{am}$ is greater than 2, and respectively proportional to $1+0.50\ n(235)$, $1+0.50\ n(305)$ and $1+0.50\ n(375)$ when the pressure ratio $P_{t5}/P_{am}$ is less than 2. The voltage $e_2$ appearing at the wiper 85, is therefore, proportional to $1+0.50\ n(A_7)$, depending on whether the ratio relay 45 is or is not energized.

The wipers 85, 78, and 87 of the potentiometers 71, 69 and 67 respectively are mechanically coupled to the exhaust nozzle area actuator 65. A mechanism, not part of the invention, is required in the linkage system coupling the potentiometer wipers to the exhaust nozzle actuator, to convert the actuator displacement to a displacement proportional to exhaust nozzle area.

The potentiometers 39 and 43 are energized by the voltages $e_1$, and $e_2$, respectively, and are actuated by the ambient pressure diaphragm capsule 33 and the turbine outlet pressure diaphragm capsule 35 respectively, proportionally to the absolute ambient and absolute tailpipe pressure respectively. The precision potentiometers 39 and 43 are mounted with the pressure transducer 31.

Hence, the outputs from the wipers 89 and 91 of these potentiometers are proportional to $P_{am}e$, and $P_{t5}e_2$. Therefore, in non-afterburner operation with the contacts 15B and 16B closed, the outputs from the wipers 89 and 91 are proportional to:

(a) $P_{am}\,m(A_7)$ and $P_{t5}[1+0.50\,m(A_7)]$ if the ratio relay is not energized or proportional to:

(b) $P_{am}\,n(A_7)$ and $P_{t5}[1+0.50\,n(A_7)]$ if the ratio relay 45 is energized.

Since the ohmic resistance of the pressure potentiometers 39 and 43 are much greater than the ohmic resistance of the area potentiometers loading effect is negligible.

The potentiometer 67 in the area transducer 63 has applied to it four voltages proportional to values of $$\frac{1}{A_7P(A_7)}$$

Values for $P(A_7)$ and for $$\frac{1}{A_7P(A_7)}$$

for tailpipe apertures having various areas, $(A_7)$ in square inches, are given in Table I for a particular engine.

TABLE I $P(A_7)$ and $\frac{1}{A_7P(A_7)}$ for Various Apertures $(A_7)$ in Square Inches for a Particular Engine

| $A_7$ | $P(A_7)$ | $1/A_7P(A_7)$ |
|---|---|---|
| 235 | 8.259 | 5.15 10⁻⁴ |
| 255 | 7.867 | 4.98 10⁻⁴ |
| 275 | 7.255 | 5.01 10⁻⁴ |
| 285 | 7.003 | 5.01 10⁻⁴ |
| 295 | 6.690 | 5.07 10⁻⁴ |
| 305 | 6.289 | 5.21 10⁻⁴ |
| 325 | 5.690 | 5.41 10⁻⁴ |
| 345 | 5.142 | 5.64 10⁻⁴ |
| 355 | 4.869 | 5.78 10⁻⁴ |
| 365 | 4.605 | 5.95 10⁻⁴ |
| 375 | 4.378 | 6.09 10⁻⁴ |

The output voltage of potentiometer 67, as picked off by the wiper 87 is used to excite the rebalance potentiometer 93, which is driven through a servo-motor 97 and a gear train (not shown) by the servo-amplifier 99. The servo-motor is energized from a 115 v. source through a phase-shifting capacitor 98. Therefore, the voltage appearing at the wiper 95 is proportional to $$\frac{\theta}{A_7P(A_7)}$$

where $\theta$ is the ratio of rotation of the wiper 95 to the total rotation.

When the three output voltages are connected in series with the proper polarity:

$$\frac{\theta}{A_7P(A_7)} \approx P_{t5}[1+0.50m(A_7)] - P_{am}m(A_7) \text{ for } \frac{P_{t5}}{P_{am}}>2$$

or $$\theta \approx A_7P(A_7)\{P_{t5}[1+0.50\,m(A_7)] - P_{am}\,m(A_7)\}$$

similarly for $$\frac{P_{t5}}{P_{am}}<2;\ \theta \approx A_7P(A_7)\{P_{t5}[1+0.50n(A_7)] - P_{am}n(A_7)\}$$

Since the dial pointer 101 is mechanically coupled to the rebalance potentiometer wiper arm 95, it indicates gross thrust on the calibration of the dial face 103. Since $P_0$ is a constant, having the value 14.7, and is a factor of the expression for gross thrust, it is taken into account in the calibration of the dial, or it may also be taken into account by the voltage values assigned to the tap points in the secondary winding of the multi-tapped transformer 105.

Similar results are obtained for afterburning operation except that the variables $P(A_7)$, $m(A_7)$ and $n(A_7)$ are replaced by constants $P_{ab}$, $m_{ab}$, $n_{ab}$, respectively.

Thus, for afterburning operation:

$$\theta \approx A_7P_{ab}\{P_{t5}[1+0.50m_{ab}] - P_{am}m_{ab}\} \text{ for } \frac{P_{t5}}{P_{ab}}>2$$

and $$\theta \approx A_7P_{ab}\{P_{t5}[1+0.5m_{ab}] - P_{am}m_{ab}\} \text{ for } \frac{P_{t5}}{P_{am}}<2$$

The instrumentation of gross thrust for afterburning operation is accomplished by closing the afterburner switch 57 which closes contacts 11F, 12F, 13F, 14F and 15F and 16F. Closing contacts 15F and 16F bypasses potentiometers 69 and 71. Thus:

(a) The constant $m_{ab}$ is substituted for the variable $m(A_7)$ when $$\frac{P_{t5}}{P_{am}}>2$$

(b) The constant $n_{ab}$ is substituted for the variable $n(A_7)$ when $$\frac{P_{t5}}{P_{am}}<2$$

(c) The constant $[1+0.50\,m_{ab}]$ is substituted for the variable $[1+0.50\,m(A_7)]$ when $$\frac{P_{t5}}{P_{am}}>2$$

and (d) The constant $[1+0.50\,n_{ab}]$ is substituted for the variable $[1+0.50\,n(A_7)]$ when $$\frac{P_{t5}}{P_{am}}<2$$

Closing contacts 11F, 12F, 13F and 14F results in the appearance of a voltage at the wiper of the rebalance potentiometer which is proportional to $$\frac{\theta}{A_7P_{ab}}$$

where $\theta$ is the ratio of rotation of the wiper to the total rotation.

Thus, with the afterburner switch turned "On":

$$\theta \approx A_7P_{t5}\{P_{ab}[1+0.50m_{ab}] - P_{am}m_{ab}\} \text{ for } \frac{P_{t5}}{P_{am}}<2$$

Figure 3:
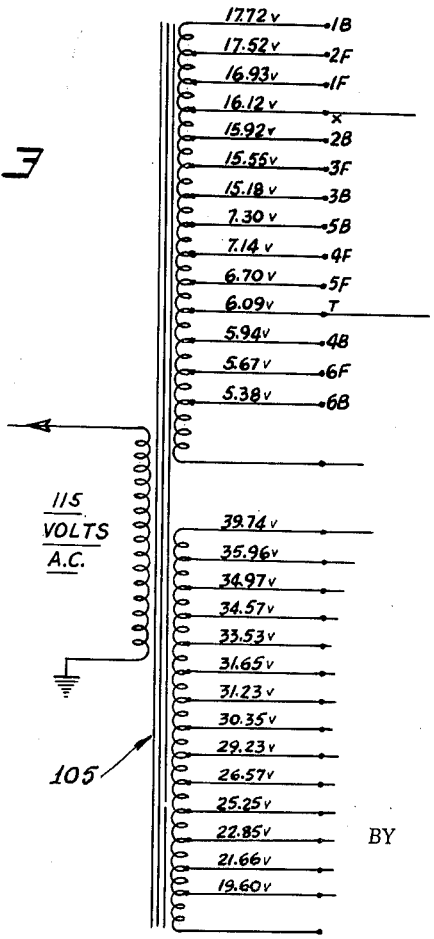
Figure 3 is the diagrammatic representation of the multitapped transformer shown in Figure 1 and showing the voltage values at the tap points.

Preferred values for the voltages at the various tap points of the multi-tapped transformer 105 appear in Figure 3.

Tap points on the secondary of the upper sections of the multi-tapped transformer are connected to like designated ratio relay switch contact points although for the purpose of simplifying the drawing these connection lines are not shown. The points designated "H" are pivot joints for the various contact making relay arms.

Adjustments for the afterburning operation of the network are made at the four gang potentiometer 109.

In actual operation, the thrustmeter according to the invention has proved highly satisfactory. Error in the indication of gross thrust, as shown by the deviation of indicated thrust from the theoretically computed thrust, is not greater than 70 pounds for non-afterburner operation. The maximum percentage of error in terms of 20,000 pounds full scale is then 0.35%.

Table II shows maximum indicator error in pounds and in percent of full scale for afterburning operation. This table compares, under conditions which have been preselected as those which could produce maximum error, gross thrust as computed in the closely approximate equations used herein and gross thrust as derived theoretically by the standard method.

TABLE II

*Errors, afterburning operations*

| $\frac{P_{am}}{P_{t5}}$ | $P_{t5}$ PSI | Theoretical Standard Method | Indicator Approximate Equa- | Indicator Error | |
|---|---|---|---|---|---|
| | | | | Lbs. | Percent of 20,000 lbs. full scale |
| 0.10 | 40 | 14,770 | 14,680 | −90 | −0.45 |
| 0.20 | 40 | 13,200 | 13,050 | −150 | −0.75 |
| 0.30 | 40 | 11,600 | 11,400 | −200 | −1.0 |
| 0.40 | 40 | 9,930 | 9,820 | −110 | −0.55 |
| 0.50 | 40 | 8,250 | 8,200 | −50 | −0.25 |
| 0.60 | 40 | 6,300 | 6,240 | −60 | −0.30 |
| 0.10 | 8.0 | 2,917 | 2,951 | +34 | 0.2 |
| 0.20 | 8.0 | 2,611 | 2,623 | +12 | 0.1 |
| 0.30 | 8.0 | 2,291 | 2,294 | +3 | ------ |
| 0.40 | 8.0 | 1,970 | 1,966 | −4 | ------ |
| 0.50 | 8.0 | 1,650 | 1,637 | −13 | 0.1 |
| 0.60 | 8.0 | 1,271 | 1,248 | −24 | 0.1 |

For engines not employing afterburner operation, the afterburner circuit may be eliminated. Thus switch 57, relay 59 and associated potentiometers 107 may be omitted.

For instrumenting engines not equipped with variable area nozzles, area actuator linkage 65 may be omitted. In this situation potentiometers 67, 69 and 71 may be employed as trimmers for compensation of minor differences between engines of a given type as may result from normal manufacturing tolerance. In equipment employing variable area nozzles the individual differences may be compensated for by simple adjustment of the mechanical linkages.

In the foregoing there has been described the action of relay 45 and means for controlling the action in terms of a particular "critical ratio." For other flight ranges, the apparatus may be designed to actuate the relay at some other critical ratio.

It will be thus seen that there is here provided an improved thrustmeter in which the several objects of this invention are achieved.

As various possible embodiments may be made of the above invention and as various changes might be made in the embodiment above set forth it is to be understood that all matter herein set forth or shown in the accompanying drawings is to be interpreted as illustrative and not in a limiting sense.

What is claimed is:

1. A thrustmeter for instrumenting the gross thrust of a turbo-jet engine, the said engine having a turbine outlet, an afterburner which is adapted to having its on and off status established selectively, and a nozzle of selectively variable area, the said thrustmeter comprising: ambient pressure sensitive means, turbine outlet pressure sensitive means, nozzle outlet area sensitive means, afterburner status switch means for producing an afterburner status signal; Wheatstone bridge means responsive to the ambient pressure sensitive means and the turbine outlet pressure sensitive means, said Wheatstone bridge means being balanced at a preselected critical ratio and producing a polarity directed unbalance signal at other ratios, computer means responsive to the ambient pressure sensitive means, the turbine outlet pressure sensitive means, the nozzle outlet area sensitive means and the afterburner switch signal for producing a signal analogous to the gross thrust according to the formula:

$$F_g = \frac{A_7 B}{P_0}[P_{t5}(1+.5B) - P_{am}SB]$$

where, $A_7$ is the exhaust nozzle cross-section in square inches as obtained by said nozzle outlet area sensitive means;
$P_0$ is the standard atmospheric pressure in p.s.i.;
$P_{t5}$ is the absolute turbine outlet pressure in p.s.i. as obtained by said turbine outlet pressure sensitive means;
S is a variable determined by the ratio $P_{t5}/P_{am}$;
$P_{am}$ is the absolute ambient pressure in p.s.i. as obtained by said ambient pressure sensitive means; and B is a variable which is equal to $A_7$, with the afterburner in "off" condition and a constant with the afterburner in "on" condition;

said afterburner status switch means being effective to vary the response of said computer so as to make the value B equal to $A_7$ with the afterburner in "off" condition and equal to a constant with the afterburner in "on" condition, said Wheatstone bridge means being effective to vary the response of the computer so as to determine the value of S by the ratio $P_{t5}/P_{am}$; and servomechanism indicator means responsive to the computer signal for indicating gross thrust.

2. A thrustmeter as described in claim 1 and wherein the Wheatstone bridge means and the computer means together include a first pair of precision potentiometers activated by the ambient pressure sensitive means and a second pair of precision potentiometers activated by the turbine outlet pressure sensitive means, wherein two precision potentiometers, including one in each of said pairs, are operatively associated with the Wheatstone bridge means, and two precision potentiometers, including the other in each of said pairs, are electrically connected with the computer means.

3. A thrustmeter as described in claim 1 and wherein the computer includes a multi-tapped transformer for providing preselected voltages to preselected points in the computer.

4. A thrustmeter as described in claim 2 and wherein the computer includes a multi-tapped transformer for providing preselected voltages to preselected points in the computer.

5. A thrustmeter for instrumenting the gross thrust of a turbo-jet engine, the said engine having a turbine outlet, and a nozzle of selectively variable area, the said thrustmeter comprising: means for sensing turbine outlet pressure and producing a signal analogous to the said turbine outlet pressure, means for sensing ambient pressure and producing a signal analogous to the said ambient pressure, means for sensing nozzle area and producing a signal analogous thereto, computer means for calculating thrust from the three sense signals and for producing a signal in accordance with the formula:

$$F_g = \frac{A_7 P(A_7)}{P_0}[P_{t5}(1+.5S(A_7)) - P_{am}S(A_7)]$$

where, $P(A_7)$ is a constant;
$A_7$ is the exhaust nozzle cross-section in square inches as obtained by said means for sensing nozzle area;
$P_{t5}$ is the absolute turbine outlet pressure in p.s.i. as obtained by said means for sensing the turbine outlet pressure;
$P_0$ is the standard atmospheric pressure in p.s.i.;
$P_{am}$ is the absolute ambient pressure in p.s.i. as obtained by said means for sensing ambient pressure; and
$S(A_7)$ is a variable determined by $P_{t5}/P_{am}$;

means for feeding the sense signals to the computer, indicator means for converting the computer signal to an indication of gross thrust, and means for transferring the computer signal to the indicator means.

6. A thrustmeter for instrumenting the gross thrust of a turbo-jet engine, the said engine having a turbine outlet, and a nozzle of selectively variable area, the said thrustmeter comprising: ambient pressure sensitive means, turbine outlet pressure sensitive means, nozzle outlet area sensitive means, Wheatstone bridge means responsive to the ambient pressure sensitive means and the turbine outlet pressure sensitive means, said Wheatstone bridge means being balanced at a preselected critical ratio and producing a polarity directed unbalance signal at other ratios; computer means responsive to the ambient pressure sensitive means, nozzle outlet area sensitive means, said Wheatstone bridge means, and the turbine outlet pressure sensitive means for producing a signal analogous to the gross thust in accordance with the formula:

$$F_g = \frac{A_7 P(A_7)}{P_0}[P_{t5}(1+.5S(A_7)) - P_{am}S(A_7)]$$

where, $A_7$ is the exhaust nozzle cross-section in square inches as sensed by said nozzle area sensitive means;
$P_{t5}$ is the absolute turbine outlet pressure in p.s.i. as sensed by said turbine outlet pressure sensitive means;
$P_0$ is the standard atmospheric pressure in p.s.i.;
$P_{am}$ is the absolute ambient pressure as in p.s.i. as sensed by said ambient pressure sensitive means;
$P(A_7)$ is a constant; and
$S(A_7)$ is a variable determined by the ratio $P_{t5}/P_{am}$ as sensed by said Wheatstone bridge means;

and servo-mechanism indicator means responsive to the computer signal for indicating gross thrust.

7. A thrustmeter as described in claim 6 and wherein the Wheatstone bridge means and the computer means together include a first pair of precision potentiometers activated by the ambient pressure sensitive means and a second pair of precision potentiometers activated by the turbine outlet pressure sensitive means, wherein two precision potentiometers, including one in each of said pairs, are operatively associated with the Wheatstone bridge means and two precision potentiometers, including the other in each of said pairs, are operatively associated with the computer means.

8. A thrustmeter as described in claim 6 and wherein the computer includes a multi-tapped transformer for providing preselected voltages to preselected points in the computer.

9. A thrustmeter as described in claim 7 and wherein the computer includes a multi-tapped transformer for providing preselected voltages to preselected points in the computer.

10. A thrust meter for instrumenting the gross thrust of a turbo-jet engine, the said engine having a turbine outlet, an afterburner which is adapted to having its on and off status established selectively, the said thrustmeter comprising: ambient pressure sensitive means, turbine outlet pressure sensitive means, afterburner status switch means for producing an afterburner status signal; Wheatstone bridge means responsive to the ambient pressure sensitive means and the turbine outlet pressure sensitive means, said Wheatstone bridge means being balanced at a preselected critical ratio and producing a polarity directed unbalance signal at other ratios, computer means responsive to the ambient pressure sensitive means, the turbine outlet pressure sensitive means, and the afterburner switch signal for producing a signal analogous to gross thrust, the said computer including means cooperatively responsive to the afterburner status signal and the Wheatstone bridge unbalance signal for producing a signal in accordance with the equation:

$$F_g = \frac{A_7 B}{P_0}[P_{t5}(1+.5SB) - P_{am}SB]$$

where, $A_7$ is the exhaust nozzle cross-section in square inches,
$P_0$ is standard atmospheric pressure in p.s.i.,
$P_{t5}$ is the absolute turbine outlet pressure in p.s.i.,
S is a variable determined by the ratio $P_{t5}/P_{am}$,
$P_{am}$ is absolute ambient pressure in p.s.i, and
B is a variable which is equal to $A_7$ with the afterburner in "off" condition and a constant with the afterburner in "on" condition;

and where the exhaust nozzle cross-section is a predetermined constant, the value $P_{t5}$ being determined by said turbine outlet pressure sensitive means, the value $P_{am}$ being determined by said ambient pressure sensitive means, B being determined by said afterburner status switch means, and the value S being obtained by said Wheatstone bridge means; and servo-mechanism indicator means responsive to the computer signal for indicating gross thrust.

11. A thrustmeter as described in claim 10 and wherein the Wheatstone bridge means and the computer means together include a first pair of precision potentiometers activated by the ambient pressure sensitive means and a second pair of precision potentiometers activated by the turbine outlet pressure sensitive means, wherein two precision potentiometers, including one in each of said pairs, are operatively associated with the Wheatstone bridge means, and two precision potentiometers including the other in each of said pairs, are operatively associated with the computer means.

12. A thrustmeter as described in claim 10 and wherein the computer includes a multi-tapped transformer for providing preselected voltages to preselected points in the computer.

13. A thrustmeter as described in claim 11 and wherein the computer includes a multi-tapped transformer for providing preselected voltages to preselected points in the computer.

14. A thrustmeter for measuring the gross thrust of a turbo-jet engine, the said engine having a turbine outlet, an afterburner which is adapted to having its "on" and "off" status, established selectively, and a nozzle of selectively variable area, the said thrustmeter comprising: means for sensing turbine outlet pressure and producing a signal related to the said turbine outlet pressure; means for sensing ambient pressure and producing a signal related to the said ambient pressure; means for sensing nozzle area and producing a signal related thereto; means for sensing afterburner status and for producing a signal related thereto; computer means for calculating thrust from the four sense signals and for producing a computer signal according to the formula:

$$F_g = \frac{A_7 B}{P_0}[P_{t5}(1+.5SB) - P_{am}SB]$$

where, $A_7$ is the exhaust nozzle cross-section in square inches,
$P_0$ is standard atmospheric pressure in p.s.i.,
$P_{t5}$ is the absolute turbine outlet pressure in p.s.i.,
S is a variable determined by the ratio $P_{t5}/P_{am}$,
$P_{am}$ is absolute ambient pressure in p.s.i., and
B is a variable which is equal to $A_7$ with the afterburner in "off" condition and a constant with the afterburner in "on" condition;

means for feeding the sense signals to the computer; means to obtain the ratio $P_{am}/P_{t5}$ and to vary the computer responsive to the ratio $P_{am}/P_{t5}$; means responsive to the afterburner status signal to vary the computer; indicator means for converting the computer signal to an indication of gross thrust, and means for transferring the computer signal to the indicator means.

(References on following page)

References Cited in the file of this patent

UNITED STATES PATENTS

| | | |
|---|---|---|
| 2,524,749 | Baldbridge | Oct. 10, 1950 |
| 2,579,617 | Schaevitz | Dec. 25, 1951 |
| 2,737,016 | Day | Mar. 6, 1956 |
| 2,767,725 | Long | Oct. 23, 1956 |
| 2,866,332 | Sherman | Dec. 30, 1958 |
| 2,941,399 | Bersinger | June 21, 1960 |

UNITED STATES PATENT OFFICE
CERTIFICATE OF CORRECTION

Patent No. 2,981,098　　　　　　　　　　　　　　April 25, 1961

Spyridon P. Antippas et al.

It is hereby certified that error appears in the above numbered patent requiring correction and that the said Letters Patent should read as corrected below.

Column 1, line 33, for "deisrable" read -- desirable --; column 4, line 38, for "0.05" read -- 0.50 --.

Signed and sealed this 19th day of September 1961.

(SEAL)
Attest:

ERNEST W. SWIDER
Attesting Officer

DAVID L. LADD
Commissioner of Patents
USCOMM-DC